(12) United States Patent
Mednikov (10) Patent No.: US 8,736,255 B2
(45) Date of Patent: May 27, 2014

(54) SENSOR ARRANGEMENT AND METHOD FOR DETERMINING THE POSITION AND/OR CHANGE IN POSITION OF A MEASUREMENT OBJECT

(75) Inventor: Vladislav Mednikov, Samara (RU)

(73) Assignee: Micro-Epsilon Messtechnik GmbH & Co. KG, Ortenburg (DE)

( * ) Notice: Subject to any disclaimer, the term of this patent is extended or adjusted under 35 U.S.C. 154(b) by 244 days.

(21) Appl. No.: 13/131,811

(22) PCT Filed: Nov. 17, 2009

(86) PCT No.: PCT/DE2009/001609
§ 371 (c)(1),
(2), (4) Date: May 27, 2011

(87) PCT Pub. No.: WO2010/069285
PCT Pub. Date: Jun. 24, 2010

(65) Prior Publication Data
US 2011/0227561 A1 Sep. 22, 2011

(30) Foreign Application Priority Data

Dec. 18, 2008 (DE) .................. 10 2008 063 528

(51) Int. Cl.
*G01B 7/14* (2006.01)
(52) U.S. Cl.
USPC ................... 324/207.11; 324/207.15
(58) Field of Classification Search
USPC ........................ 324/207.11, 207.15
See application file for complete search history.

(56) References Cited

U.S. PATENT DOCUMENTS

| | | | |
|---|---|---|---|
| 4,774,465 A | 9/1988 | Nilius | |
| 5,365,391 A * | 11/1994 | Sugiyama et al. | ............ 360/110 |
| 6,246,230 B1 | 6/2001 | Mednikov | |
| 7,868,609 B2 | 1/2011 | Zhitomirskiy | |
| 2010/0039108 A1 | 2/2010 | Haevescher et al. | |

FOREIGN PATENT DOCUMENTS

| | | |
|---|---|---|
| DE | 36 10 479 A1 | 1/1987 |
| DE | 39 14 787 | 11/1990 |
| DE | 43 11 973 A1 | 2/1997 |
| DE | 100 44 839 A1 | 4/2001 |
| DE | 100 16 540 CI | 7/2001 |
| EP | 0 916 075 B1 | 5/1999 |
| GB | 1 496 976 | 1/1978 |
| WO | WO 2007/003913 A2 | 1/2007 |

OTHER PUBLICATIONS

International Preliminary Report on Patentability for International Application No. PCT/DE2009/001609.
International Search Report for International Application No. PCT/De2009/001609.

* cited by examiner

*Primary Examiner* — Reena Aurora
(74) *Attorney, Agent, or Firm* — Alston & Bird LLP (57) ABSTRACT

A sensor arrangement for determining the position and/or change in position of a measurement object relative to a sensor, wherein a magnet is assigned to the measurement object, is configured, with respect to the design of an operationally reliable sensor with low production costs, such that the sensor has a first conductor and a second conductor which is arranged alongside the first conductor and such that a magnetically soft film is arranged in the area of influence of the first and second conductors, the permeability of which film changes under the influence of a magnetic field and which film influences the electromagnetic coupling between the first and second conductors. A corresponding method is specified.

20 Claims, 10 Drawing Sheets

SENSOR ARRANGEMENT AND METHOD FOR DETERMINING THE POSITION AND/OR CHANGE IN POSITION OF A MEASUREMENT OBJECT

BACKGROUND OF THE INVENTION

1. Field of the Invention

The invention relates to a sensor configuration for determining the position and/or change in position of a measurement object relative to a sensor, such that a magnet is assigned to the measurement object. The invention also relates to a corresponding method.

2. Description of Related Art

Sensor configurations and methods for determining the position and/or change in position are widely used in practice. The positions of pistons, valves, carriages or other movable elements are determined. Areas of application range from household appliances to motor vehicles to precision engineering or industrial manufacturing lines. It is often extremely important for the position or change in position of a measurement object to be detectable with a high sensitivity.

Capacitive or inductive sensors are frequently used, determining the feedback effect of a measurement object on the sensor. Traditional magnetic sensors use the ferromagnetic properties of a measurement object or eddy currents induced in a measurement object. In addition, another class of sensors is known in which a soft magnetic core is influenced by a magnet assigned to the measurement object. Thus, for example, DE 36 10 479 A1 discloses a sensor in which a magnet brings a soft magnetic core to saturation locally and thereby generates a virtual air gap. The position of the air gap can be read out.

Another possibility of measuring the position which also utilizes the effect of a magnet on soft magnetic materials is disclosed in EP 1 721 130 B1 where an alternating field is generated by a conductor loop, inducing a voltage in a sinusoidal conductor structure which acts as a secondary coil. By superimposing a plurality of sinusoidal structures, the direction of movement and position of a measurement object can be determined. However, it has proven to be a disadvantage that the conductor structure has a relatively complex design, must be manufactured with precision, the sensor is designed to be quite broad and a carrier having conductors applied to two sides is always required. This results in relatively high costs in fabrication and an inflexible use.

Another position sensor which operates according to a comparable principle is known from DE 39 14 787 A1. The sensor has a primary coil and at least one secondary coil which are wound around a shared soft magnetic core. A magnet which brings the core locally to saturation as a function of the position of the measurement object is assigned to a measurement object. The resulting virtual air gap acts on the impedance of the coils and their transformation ratio, which can be detected by the measurement technology. For linearization of the characteristic line, the shape of the core is varied in the longitudinal direction. To do so, the core must be machined and the coils must be wound on an oblique core which results in a cost-intensive production of the sensor. Furthermore, the sensor is relatively large which interferes with or completely prevents its use in many areas.

Therefore the object of the present invention is to design a sensor configuration of the type defined in the introduction and to improve upon it, such that the result is a sensor that is more reliable in operation, can be manufactured at a low manufacturing cost and can be used in a flexible manner.

SUMMARY OF VARIOUS EMBODIMENTS

According to the invention, the object defined above is achieved by the features of various sensor configuration embodiments described herein. According to this, the sensor configuration in question is designed so that the sensor has a first conductor and a second conductor arranged longitudinally to the first conductor, and a soft magnetic film is arranged in the area of influence of the first conductor and the second conductor, such that the permeability of this film changes under the influence of a magnetic field and influences the electromagnetic coupling between the first conductor and the second conductor.

From the standpoint of the process, the object defined above is achieved by the features of various method embodiments described herein. According to this the method in question is characterized in that an alternating field is generated by an AC current flowing through a first conductor of the sensor, and this alternating field induces a voltage in a second conductor arranged longitudinally to the first conductor, such that the electromagnetic coupling between the first conductor and the second conductor is influenced by a soft magnetic film whose permeability changes under the influence of a magnetic field.

In an inventive manner it was first recognized that a complex design of the conductor of the sensor is unnecessary. Therefore according to the invention the conductor used has a second conductor arranged along its side longitudinally at a distance. This distance ensures that there is no ohmic contact between the first conductor and the second conductor. The conductors have a comparatively simple design, but despite the very simple design the resulting sensor works amazingly well. A soft magnetic film is arranged in the area of influence of the first conductor and the second conductor, its permeability changing under the influence of a magnetic field. Due to the arrangement of the soft magnetic film in the area of influence of the conductors, the film affects the electromagnetic coupling between the first conductor and the second conductor. Since the permeability changes under the influence of a magnetic field, the, electromagnetic coupling between the first and the second conductor can vary under the influence of a magnetic field. If a magnet is assigned to the measurement object, this effect can be utilized by the sensor and analyzed. This results in a sensor having a very small design, so that its use even in spatially limited areas is also possible. The very simple basic design yields a sensor that is simple and inexpensive to manufacture and is suitable for determining the absolute position.

The first conductor or second conductor especially preferably has at least one pickup for the analysis by means of which the respective conductor is subdivided into at least two subsections. Therefore, the ratio of the design length of the sensor to its measurement range, which is already very good, can be further improved. By analyzing the electromagnetic coupling in a suitably defined subsection, the position and/or change in position of a measurement object can be determined. The magnet assigned to the measurement object leads continuously to an influence on the electromagnetic coupling as a function of its position. When there is a strong influence of the magnet, the soft magnetic film is brought to saturation and becomes transparent for electromagnetic fields. Therefore the electromagnetic coupling in the area of or in the vicinity of saturation is greatly reduced or nonexistent. The greater the reduction in the field strength of the magnet, the greater the cross-coupling of the magnetic field from one conductor to the other conductor may be. Since this process takes place continuously, inferences about the position and/or change in position of a measurement object can be derived from values representing the electromagnetic coupling in the individual subsections.

It should be pointed out that there need not necessarily be saturation of the soft magnetic film. Instead it is sufficient that there is an influence on permeability due to the magnet. This influence can lead to saturation in the case of strong magnets. Weaker magnets or those arranged at a greater distance, which do not induce saturation, can nevertheless be used for the sensor. In this case the soft magnetic film does not become completely transparent with respect to electromagnetic fields. Nevertheless, an adequate position-dependent influence on the electromagnetic coupling is achieved.

It should also be pointed out that instead of a soft magnetic film, a soft magnetic thin film could also be used. This thin film may be vapor-deposited onto the structure or may be applied by other methods which are known in practice. The choice of a soft magnetic layer or a soft magnetic thin film will depend on the respective area of use and the manufacturing process of the sensor. Amorphous or nanocrystalline materials may be used as the soft magnetic material that may be used to form the soft magnetic film or the soft magnetic thin film.

The first conductor and the second conductor are advantageously applied to a substrate. The substrate may be formed by a wide variety of materials. A circuit board may be just as suitable for a substrate as ceramics, plastic parts or a plastic film. In principle even metals may be used as substrates but in this case it is merely necessary to have adequate electrical insulation with respect to the conductor structures, but that is generally simple to implement. The prerequisite of the substrate is only that the substrate offers adequate properties to support the conductor structure. The substrate might be rigid or flexible, solid or film-like. For example, thin flexible substrates allow the sensor to be glued to a substrate in relatively any manner and allow the sensor to be optimally adapted to any contour. The sensor may therefore be used in a curved form. Which substrate is selected and which mechanical properties the substrate should have are determined by the respective application of the sensor.

Depending on the application, even the substrate may be omitted in that the soft magnetic film itself is used as the carrier of the conductors. For example, if the sensor is not exposed to any great mechanical stresses or is glued to a substrate under normal operating conditions, an especially inexpensive design that is simple to manufacture can be achieved in this way. The film would have to be suitably insulated with respect to the conductors in order to ensure the function of the sensor. This could be achieved, for example, by applying a lacquer layer to the soft magnetic film before applying the conductors to the film.

The first conductor and the second conductor are preferably arranged at a distance from one another. This distance could be constant along the conductor, but this distance could also vary. The characteristic line of the sensor can be adjusted comparatively easily by varying the distance. It is true in general that the sensor has a higher sensitivity in areas with a smaller distance than in areas with a greater distance. Therefore, linearization of the characteristic line can be achieved. On the other hand, the sensor could also be designed so that it has a higher sensitivity in a defined range than in another range. Therefore, for example, ranges around a zero position may be designed to be particularly sensitive to changes in position while the outer ranges have a lower sensitivity.

In addition, or as an alternative to a variation of the distance, the first conductor or second conductor could be trimmed by a laser. The characteristics of the conductor of the sensor can therefore be influenced in a targeted manner, so that calibration of each sensor is possible to compensate for manufacturing tolerances.

According to one embodiment of the invention, the first and/or second conductor may be designed to be straight, i.e., as a straight piece. The two straight pieces may be arranged essentially parallel to one another. However, it is also possible for one of the two conductors or both conductors to have a bend at one or more locations, so that a variation in the distance between the two conductors can be implemented. In this case the conductors per se would be designed as a row of straight pieces.

Alternatively, the conductors may be designed as a curve. The curve has a simple design in general. For example, a segment of a curve would be conceivable here. The two conductors could be in the form of circles and/or arcs of circles arranged one inside the other, e.g., concentrically. Therefore, even nonlinear movements would be detectable by means of the sensor configuration. In this way, rotational movements of the measurement object or movements on a circular path can also be detected. This sensor could thus be used for angle measurements.

In addition, the two embodiments described previously could be combined. For example, the first conductor could be designed to be straight while the second conductor is part of a curve or vice versa. The prerequisite here—as with the embodiments described above—is that the two conductors run at a comparatively small distance from one another. Distances down to the low two-digit millimeter range may be applied here appropriately.

When using curved conductors, the substrate may be designed according to the conductor. For example, in the case of conductors which are portions of two concentric circles, the substrate may also be designed to be circular, i.e., as a segment of a ring, according to the shape of the conductor. This would make it possible to implement a substrate with minimal use of material. Furthermore, special installation situations, for example, an arrangement of the sensor around a shaft or an axle, may also be taken into account.

To achieve a particularly great influence on the magnet, a soft magnetic film could be provided on both sides of the conductor. The soft magnetic films would thus shield the two conductors toward both sides and make available a path having a defined magnetic resistance. Thus the electromagnetic fields generated by one of the two conductors could be input into the other conductor via the magnetic circuit formed by the magnetic films. If a measurement object having a magnet is located near the sensor, then both soft magnetic films are influenced so that the magnetic resistance changes to a greater extent than is the case with only one film. This leads to a significantly stronger measurement effect, which facilitates the detection of the position and/or change in position of the measurement object.

The first conductor is preferably connected to an alternating current source. This alternating current source generates an alternating current in the first conductor which results in an alternating field. This alternating field is emitted by the first conductor and travels over the soft magnetic film(s) to the second conductor which may be connected to an analysis circuit for detection. It has proven favorable to set the feed frequency between 1 MHz and 20 MHz. The relatively high feed frequency results in a very high bandwidth of the sensor which cannot be achieved with known sensors using coils.

The magnet assigned to the measurement object could be formed in various ways. For example, the magnet might be formed by a permanent magnet or by a coil through which a direct current flows. In both cases the magnet could be arranged in such a way that the north-south direction of the magnet runs essentially parallel to the conductors, or in the case of a curved embodiment of the conductor or a curved or arched sensor it may run essentially tangentially to the conductors. Due to this type of arrangement, a larger measurement range may be achieved in comparison with an arrangement of the magnet across the conductors. However, the magnet may nevertheless still be arranged across the conductors. The movement of the magnet and thus of the measurement object could be in the longitudinal direction of the conductors in both cases.

The magnet could also be arranged at different locations in relation to the conductors. The prerequisite is that the magnet must be arranged close enough to the sensor to be able to adequately influence the soft magnetic film(s). The magnet can be arranged in the area of the plane spanned by the two conductors. Alternatively, the magnet could be located above the two conductors in the area of the center plane of the two conductors. Intermediate positions are also conceivable.

When using a single pickup, it may be arranged at the center of the respective conductor. The pickup would thus have the function of a central pickup which subdivides the conductor into two essentially equally large subsections. This permits a use as a differential sensor in whose equally large subsections an almost identical electromagnetic coupling is established when the magnet is in the middle position. The sensor then has an S-shaped characteristic line and also offers advantages with respect to the measurement range and compensation of interfering influences such as temperature or electromagnetic interference.

When there are two or more pickups, the pickups may be arranged equidistantly. Therefore the conductor is subdivided into several subsections of equal size. This in turn results in a comparable electromagnetic coupling being in effect between each subsection of one conductor and the other conductor without any influence by the magnets on the measurement object. This in turn reduces the complexity that would have been necessary for linearization and adjustment measures. To achieve a specially designed characteristic line, however, the pickups cannot be arranged equidistantly. Although a lower voltage is induced in shorter subsections than in longer subsections, the spatial resolution can be increased by shorter subsections in this area. In general it is true that the ratio of the design length of the sensor to its measurement range can be increased by having a larger number of pickups—regardless of their spacings in relation to one another.

Various possibilities are available for evaluation of the sensor. For example, the pickups on the second conductor which is used for detection of the electromagnetic waves emitted through the first conductor may be connected to a resistor. The terminals of the resistors facing away from the sensor could be connected to a summation device which forms the sum of the voltages applied to the individual inputs. Through a suitable design of the resistors, an analog output signal representing the position of the measurement object in an unambiguous manner can be obtained in this way. In an alternative embodiment the pickups are connected directly to a summation device. A corresponding analysis is described in EP 0 916 075 B1, to which reference is herewith made. Another alternative utilizes an amplifier at each pickup. The signals amplified with a suitable gain factor are then sent to a summation device.

Alternatively, the subsections of the second conductor may be wired together externally in such a way that the voltages induced in individual subsections compensate one another essentially mutually when the magnet and thus the measurement object are in a zero position. If the measurement object is moved out of this zero position, the equilibrium is disturbed and a voltage representing the position of the measurement object is output. This analysis principle is known, for example, from the field of LVDT (linear variable differential transformer). By combining two of these conductors with a soft magnetic film, however, the measurement effect is much greater than it would be with the traditional LVDT or comparable sensor configurations.

Various possibilities are conceivable in operation of the sensor configuration. For example, the first conductor through which an alternating current flows may be provided with one or more pickups. In this case, an alternating current may be applied one after the other to the individual subsections formed by the pickups and/or the terminals of the first conductor. Spatial resolution is obtained by analyzing the electromagnetic coupling between the first conductor and the second conductor only in a defined subarea. This subarea is defined by the pickups forming the electric circuit and/or one end of the conductor and a pickup. First, pickups directly adjacent to one another could be used for electric flow, but it would also be conceivable to input an alternating current at a pickup/terminal and output it again at a pickup/terminal not directly adjacent to the former.

In addition, one or more pickups on the second conductor could be used for spatial resolution of the analysis, such that the second conductor would be used for analysis of the electromagnetic coupling. Then the subsections formed by the pickups and/or one end of the conductor and the pickup could be analyzed one after the other. To do so, the individual subsections could be connected one after the other to an analysis circuit. Alternatively, multiple analysis circuits or multiple inputs of one analysis circuit could be provided with which the subsections could be analyzed essentially in parallel. The first option presented offers the advantage that only one analysis circuit is necessary and thus the electronics can be manufactured more favorably. A parallel analysis of multiple subsections allows higher dynamics of the detected movement of the measurement object because the measurements here are influenced only insignificantly or not at all by movement of the measurement object during a measurement cycle.

BRIEF DESCRIPTION OF THE SEVERAL VIEWS OF THE DRAWINGS

There are now various possibilities for advantageously embodying and improving upon the teaching of the present invention. For this purpose, reference is made, firstly, to the various embodiments described herein and, secondly, reference is made to the following explanation of preferred exemplary embodiments of the present invention on the basis of the drawings. In combination with the explanation of the preferred exemplary embodiment of the invention on the basis of the drawings, generally preferred embodiments and refinements of the teaching will also be explained. In the drawings.

DETAILED DESCRIPTION

Figure 1:
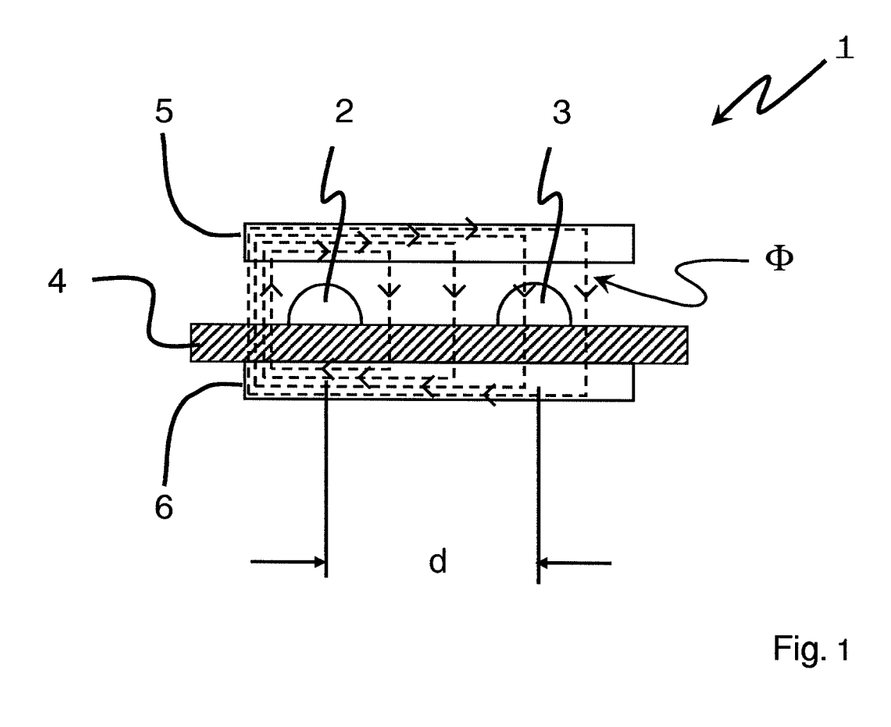
FIG. 1 shows a section through a sensor according to the invention.

FIG. 1 shows a sensor 1 according to the invention, in which a first conductor 2 and a second conductor 3 are arranged at a distance d on a substrate 4. The substrate 4 is formed by a circuit board and the conductors are embodied as printed conductors on the circuit board. A soft magnetic film 5 and 6 deflects the electromagnetic field generated by the first conductor toward the second conductor 3, these films being applied on both sides of the conductors 2 and 3, i.e., one above the conductor and one beneath the conductor. The magnetic flux $\phi$ adjusted through a current flow in the first conductor 2 is shown with a dotted line, for example. Between the soft magnetic film 5 and the conductors 2 and 3 an insulation layer is provided, ensuring electric insulation from the conductors 2 and 3. The insulation layer is not shown in FIG. 1 for the sake of simplicity; instead the soft magnetic film 5 is shown at a distance from the conductors 2 and 3.

Figure 2:
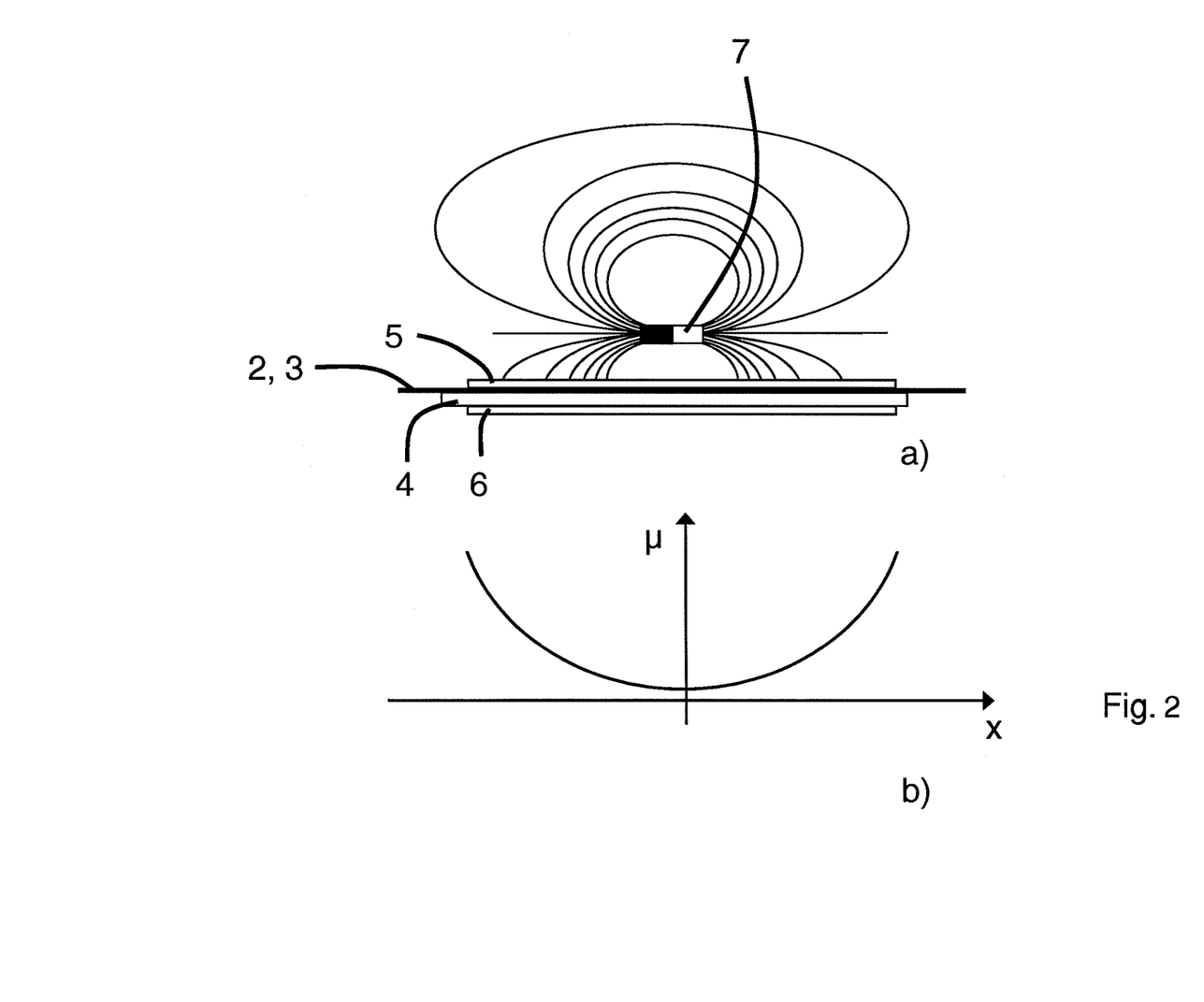
FIG. 2 shows a side view of the sensor according to FIG. 1 with a magnet and a diagram of the resulting permeability of the soft magnetic film.

FIG. 2a) shows a side view of the sensor 1 according to FIG. 1. A conductor 2 or 3 extending to the left and right is shown on the substrate 4, covered by the self-magnetic film 5 at the top and a soft magnetic film 6 also being arranged on the side opposite the substrate. The part of the conductor covered by the soft magnetic film is to be regarded as the effective conductor. The electromagnetic coupling in the parts covered by the soft magnetic film is so slight that these parts have only a slight influence on the coupling between the two conductors and are therefore negligible.

In the vicinity of the sensor 1, a magnet 7 is arranged above the two conductors, its north-south direction being oriented along the sensor and/or along the conductors. FIG. 2a) shows a few field lines of the magnet. The magnet 7 influences the soft magnetic films 5, 6 so that the films 5, 6 are influenced to different extents by the soft magnetic film for electromagnetic fields. The resulting permeability $\mu$ of one of the self-magnetic films is shown beneath the sensor configuration in FIG. 2b) where it can be seen that the permeability in the immediate vicinity of the magnet is much lower than that in the edge areas. Therefore, the electromagnetic coupling in this area between the first conductor and the second conductor is almost canceled whereas the soft magnetic films on the edge of the sensor still make a significant contribution toward coupling between the conductors. From the fact that a value not equal to zero is established at the minimum, it can be seen that the films do not reach saturation but do come very close to it. It should be pointed out that the curve shown in FIG. 2b) is given merely as an example and only approximately reflects the actual permeability curve.

Figure 3:
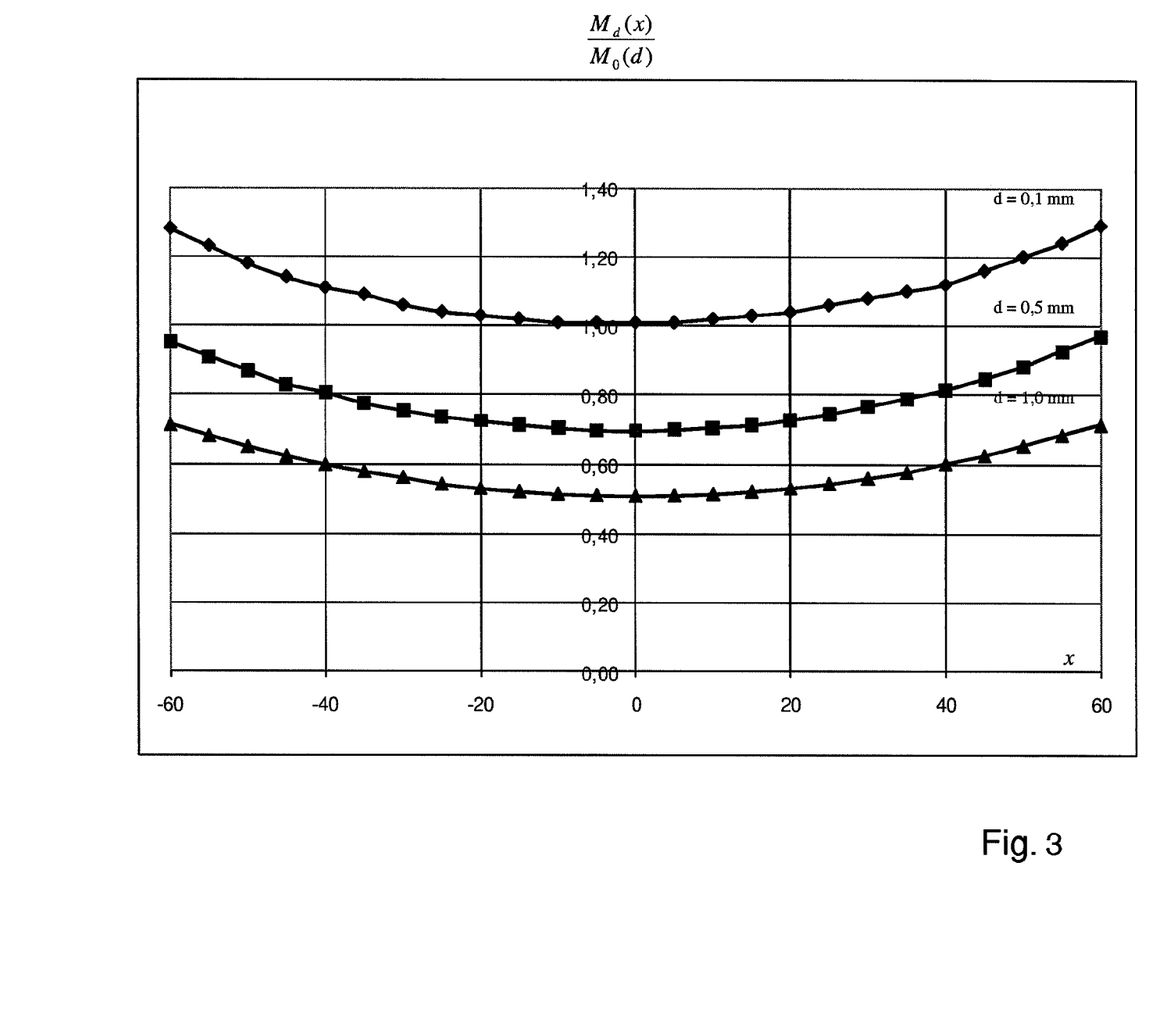
FIG. 3 shows a diagram with a set of curves showing the relative coupling $M_d(x)/M_0(d)$ between the first conductor and the second conductor along the measurement range x as a function of the distance d between the conductors.

FIG. 3 shows the distribution of the relative coupling $M_d(x)/M_0(d)$ between the first conductor and the second conductor along the measurement range x for an exemplary sensor. The parameter of the set of curves shown here is the distance d between the conductors. The relative coupling $M_d(x)/M_0(d)$ changes almost exponentially with the distance d. FIG. 3 shows that the characteristic line of the sensor can be influenced with a change in the distance. Thus a linearization or a shaping of a desired characteristic line can be achieved.

Figure 4:
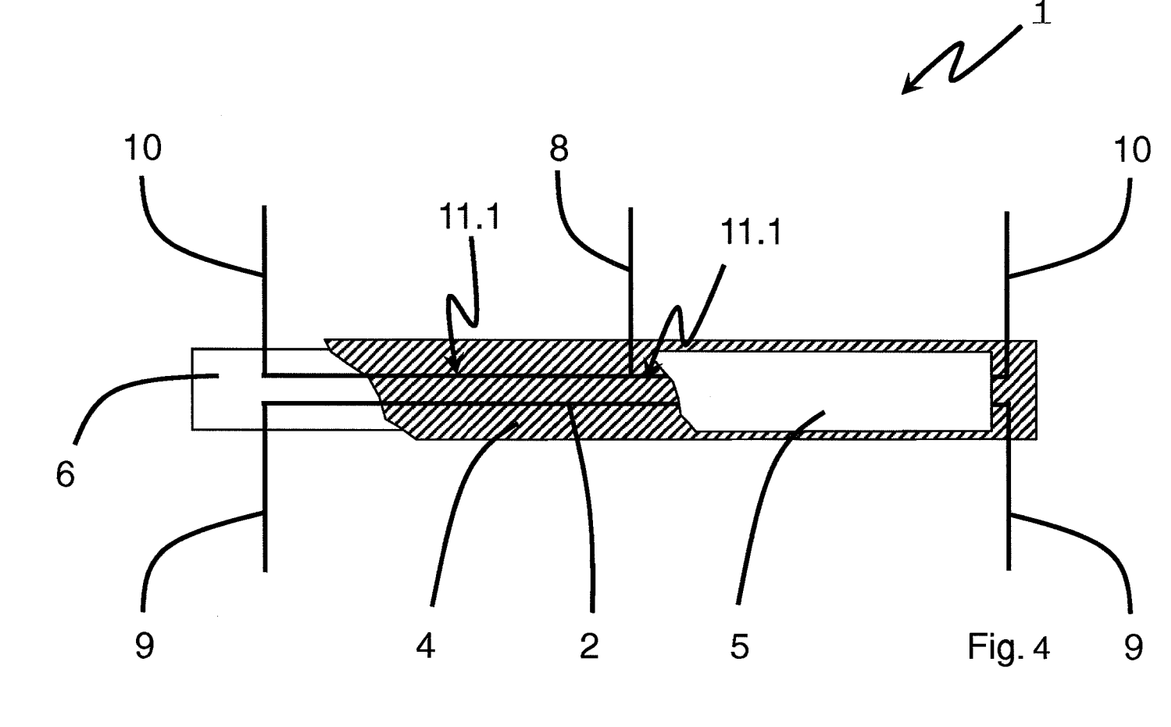
FIG. 4 shows a view of the sensor from above according to FIG. 1 in a first embodiment with a pickup in the middle of the second conductor.

FIG. 4 shows a view of the sensor 1 according to FIG. 1, with a pickup 8 being provided in the middle of the second conductor 3. The first conductor 2 is connected to an alternating current source (not shown) via the terminals 9, this AC source generating an alternating current in the first conductor 2. The alternating current generates an electromagnetic field which induces a voltage of the same frequency in the second conductor 3 via the soft magnetic films 5 and 6. The degree of the magnetic coupling between the first conductor 2 and the second conductor 3 depends on the magnetic field of the magnet assigned to the measurement object which influences the permeability of the soft magnetic films. The second conductor 3 is connected via the two terminals 10 and the pickup 8 to an analysis circuit which analyzes the electromagnetic coupling between the first conductor and the second conductor.

Figure 5:
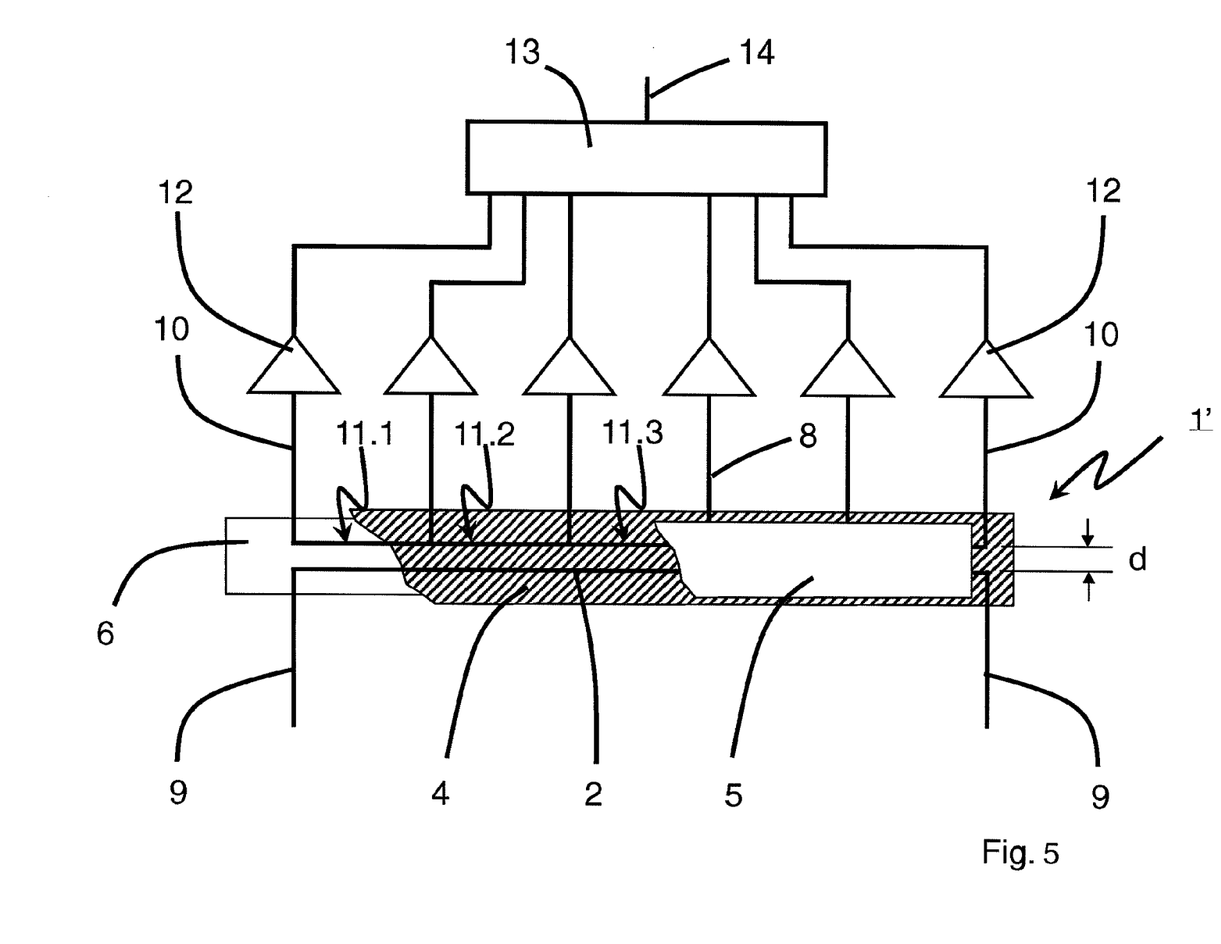
FIG. 5 shows a view of the sensor from above according to FIG. 1 in a second embodiment with four pickups on the second conductor and an analysis circuit as an example.

FIG. 5 shows another embodiment of a sensor 1' according to the invention. A first conductor 2 and a second conductor 3 are arranged on a substrate 4 at a distance d, with a soft magnetic film 5 and 6 arranged on both sides of each of the conductors 2 and 3. The upper film in the figure is only partially indicated for the sake of simplicity—as also done in FIG. 4. However, the film extends to the end of film 6. The same thing is also true of the substrate 4.

The first conductor 2 is connected by the terminals 9 to an alternating current source (not shown) which generates a current flow and thus an electromagnetic field around the first conductor 2. The electromagnetic field is input via the soft magnetic films 5 and 6 into the second conductor as a function of the change in permeability induced by the magnets of the measurement objects, so that a voltage is induced in the second conductor. The electromagnetic coupling between the first conductor 2 and the second conductor 3 can be analyzed in the partial areas 11.1 to 11.5 defined by the pickups 8 via the terminals 10 of the second conductor and four pickups 8 distributed equidistantly over the second conductor 3.

FIG. 5 additionally shows an example of an analysis circuit in the upper area. The pickups 8 and the terminals 10 of the second conductor 3 are each connected to an operational amplifier 12 which amplifies the applied voltage with a gain factor $K_1, \ldots, K_5$ and/or $K_6$. The gain factors may be selected so as to yield a linear characteristic line of the entire configuration. The outputs of the amplifiers are switched to the inputs of a summation device 13 which outputs the sum of the input signals as output signal 14 from the analysis circuit. With this design of the analysis circuit, the individual subareas 11 are analyzed in parallel. Alternatively, instead of the operational amplifier, resistors may also be used and analysis according to EP 0 916 075 B1 may be performed.

FIG. 6 shows a series of conductor configurations, which differ in the course of the distance d between the first conductor and the second conductor. In all subfigures, a pickup 8 is designed as a center pickup on the second conductor 3. The soft magnetic film is indicated with dotted lines. A magnet 7 in the form of a permanent magnet is arranged near the sensor, this magnet being displaceable in the longitudinal direction to conductors 2 and 3. The magnet 7 is located in the area of a plane spanned by the two conductors 2 and 3.

Figure 6A:
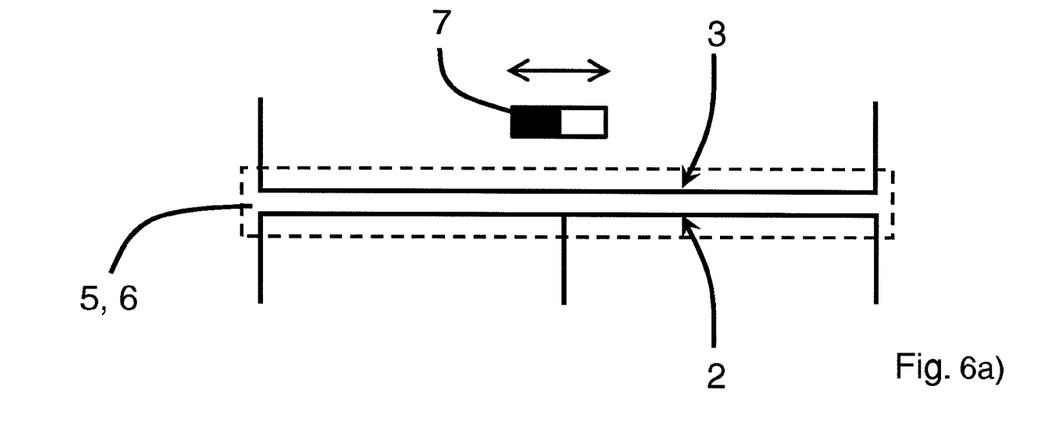
FIG. 6 shows a view of the conductor structure of a sensor with a pickup in the middle of the first conductor with a constant and variable distance.
Figure 6B:
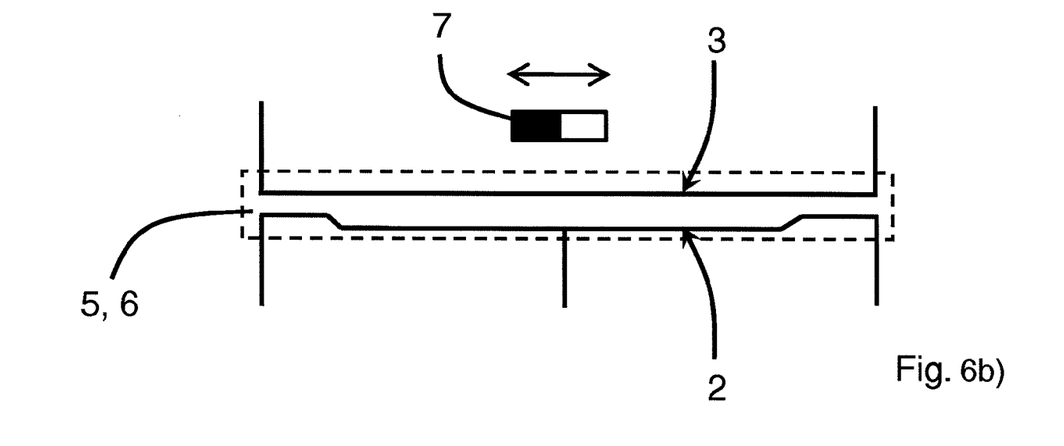
Figure 6C:
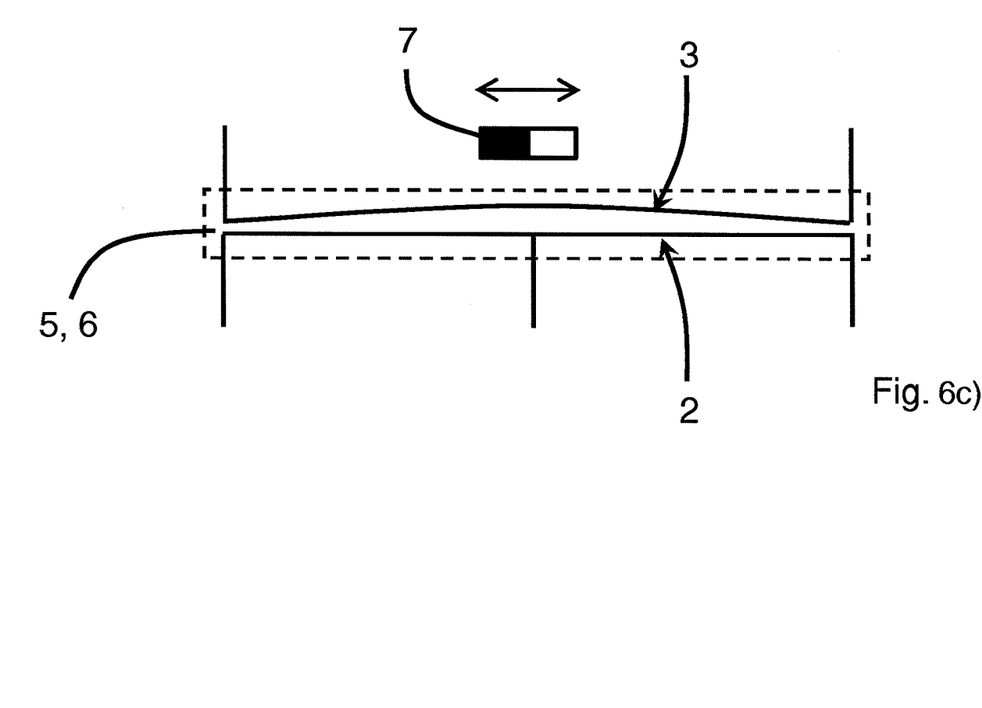

FIG. 6a) shows a conductor configuration, in which the first conductor 2 and the second conductor 3 are arranged in parallel with one another and at a constant distance d. With the conductor arrangement according to FIG. 6b), the second conductor 3 has bends, which result in a second conductor 3, in which individual parts are arranged parallel to the first conductor 2 which is designed as a straight line. All the parts of the first conductor and the second conductor are arranged in a plane. In FIG. 6c) a distance variation is formed by the fact that the first conductor 2 describes a curve in the form of an arc of a circle. The second conductor 3 is designed to be straight.

Figure 7:
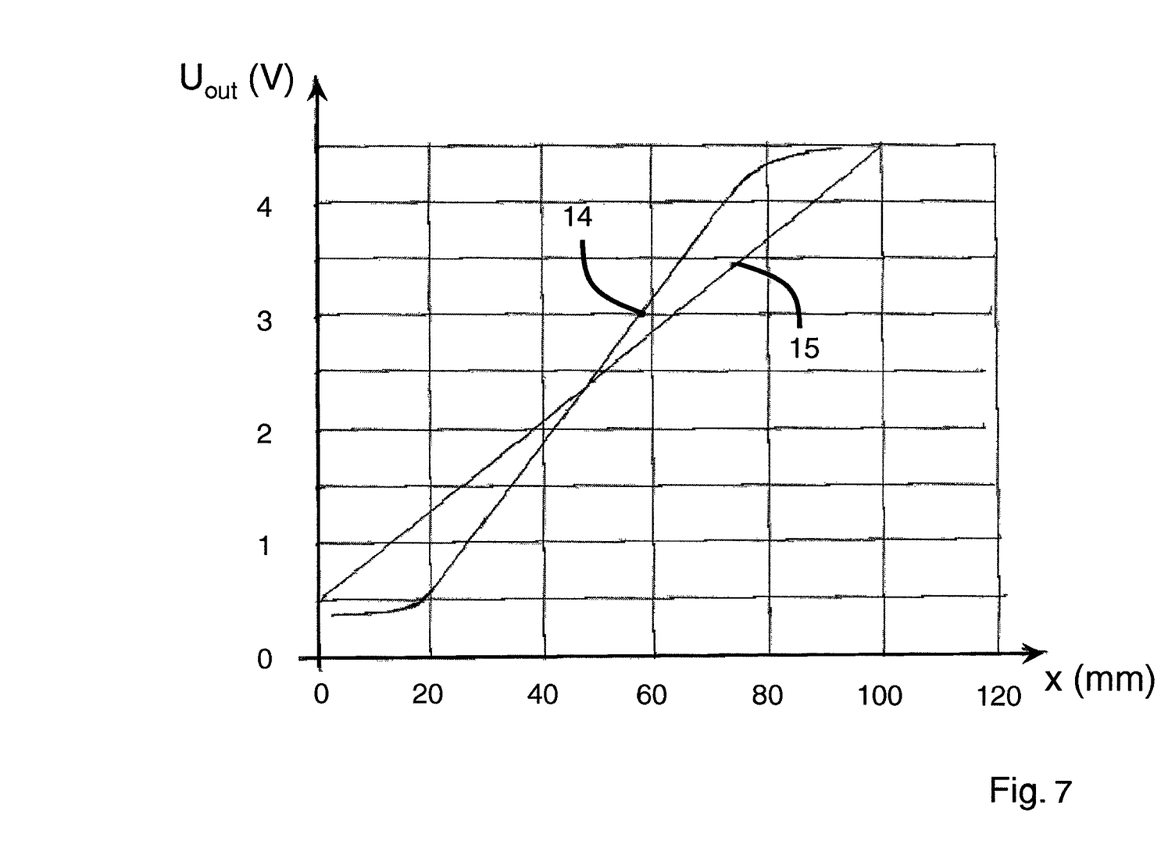
FIG. 7 shows an output voltage characteristic line of a sensor having the conductor structures according to FIG. 6.

FIG. 7 shows the respective characteristic lines of the sensors according to FIG. 6. Characteristic line 15 shows the relationship between the position of the magnet and the output voltage in the case of the sensor according to FIG. 6a). The straight line 16 represents the characteristic line of the sensor according to FIG. 6c). The characteristic line of the sensor according to FIG. 6b) does not yield a completely linear characteristic line, but it does approximate it. It can be seen here that a linearization of the characteristic line can be achieved by a variation in the distance.

Figure 8:
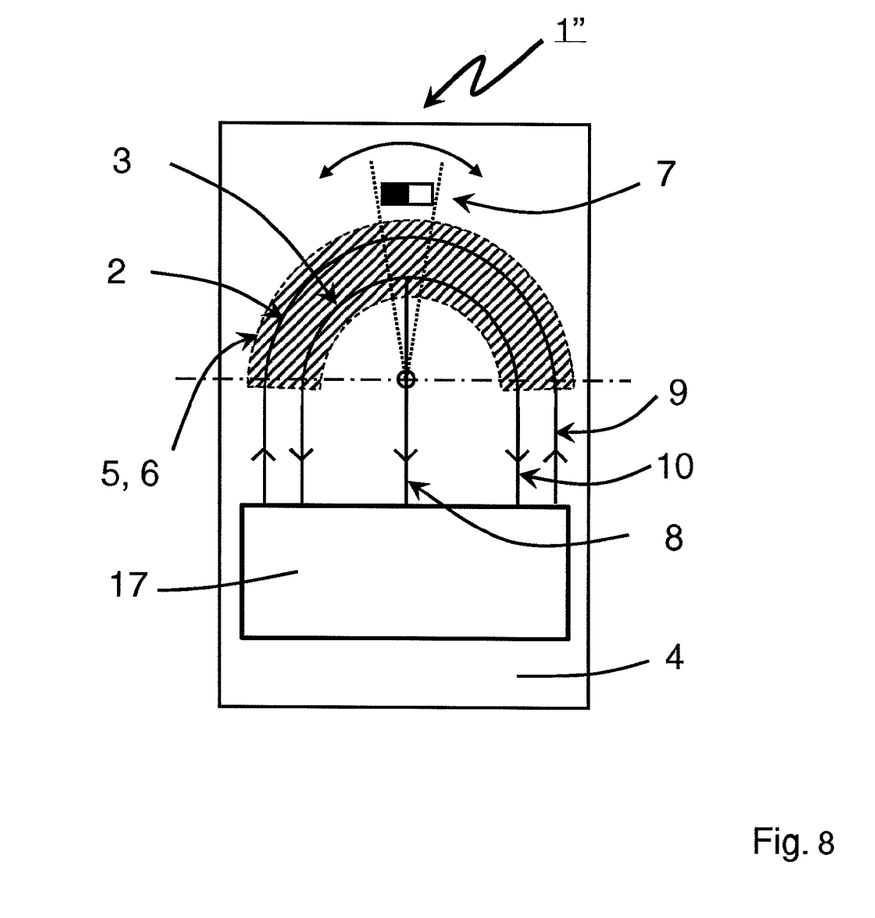
FIG. 8 shows an embodiment of a sensor according to the invention for measurement of circular movements.
Figure 9:
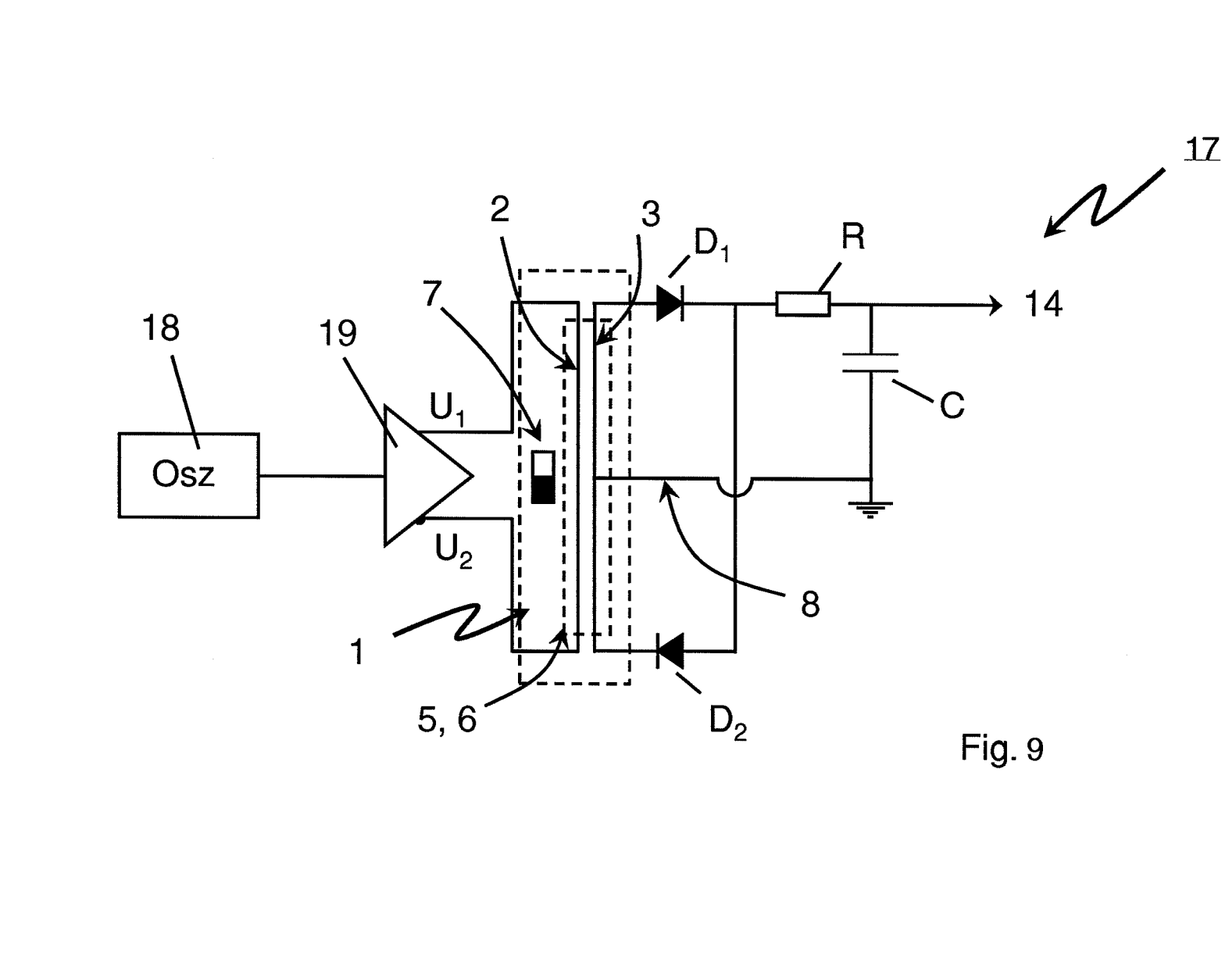
FIG. 9 shows an example of an analysis circuit for analysis of a sensor configuration according to the invention.

FIG. 8 shows another embodiment of a sensor 1" according to the invention. A first conductor 2 designed in the form of a circle and a second conductor 3 designed concentrically with the former are applied to a substrate 4. Again a soft magnetic film 5 and 6 is arranged on each side of the conductor. The terminals of the conductors 2 and 3 are connected to an analysis circuit 17 which determines the position of a measurement object. In FIG. 9, the measurement object is represented by a magnet 7, which is movable along a circular path. A center pickup 8 is connected to the second conductor. The sensor shown in FIG. 9 is suitable for measuring angular movements. The measurement principle corresponds to that described previously in conjunction with the linear sensors.

FIG. 9 shows another embodiment of an analysis circuit 17 with which the signals of a sensor 1 according to the invention can be analyzed. A sensor 1 according to FIG. 4 which is formed from a first conductor 2 and a second conductor 3 and has a pickup 8 at the center of the second conductor 3 is acted upon by an alternating current at the input end, i.e., at the terminals of the first conductor 2. For this purpose, an oscillator 18 supplies the first conductor 2 with two complementary voltages $U_1$ and $U_2$ via a sensor driver 19. One magnet 7, which is assigned to a measurement object (not shown), influences the permeability of two soft magnetic films 5 and 6 which influence the electromagnetic coupling between the first conductor 2 and the second conductor 3 as a function of the position of the magnet 7.

The voltage induced in the second conductor 3 is supplemented to form a circuit via two diodes $D_1$ and $D_2$. At the connection point between the diodes $D_1$ and $D_2$ a resistor R is connected, its second terminal being connected to a capacitor C acting as a low-pass filter and output as output signal 14 of analysis circuit 17. The second terminal of capacitor C is connected to ground and to the pickup 8 of the second conductor 3.

The sinusoidal alternating voltage generated by the sensor driver 19 generates an electromagnetic field, which is input into the second conductor 3 via the soft magnetic films 5 and 6. A voltage is induced there, leading to a mutual compensation of voltages at the middle position shown in FIG. 6. If the magnet 7 moves out of this middle position, then a different magnetic coupling is induced in the two subsections of the second conductor 3 defined by the pickup 8, so that the voltages induced in the subsections change. This results in an output voltage which is different from zero and is output as output signal 14 from the analysis circuit 17 after being low-pass filtered. An S-shaped characteristic line like that shown with reference numeral 12 in FIG. 8 is established.

With regard to additional advantageous embodiments of the sensor configuration according to the invention and the method according to the invention, reference is made to the general portion of the description and to the accompanying patent claims to avoid repetition.

Finally, it should be pointed out explicitly that the exemplary embodiments of the configuration according to the invention described above are presented merely for the purpose of illustration of the teaching claimed here which is by no means restricted to these exemplary embodiments.

The invention claimed is:

1. A sensor configuration for determining the position or change in position of a measurement object relative to a sensor, said sensor configuration comprising:
   a sensor; and
   a magnet assigned to the measurement object,
   wherein the sensor has a first conductor and a second conductor arranged longitudinally to the first conductor, and a soft magnetic film whose permeability changes under the influence of a magnetic field and which influences the electromagnetic coupling between the first conductor and the second conductor is arranged in the area of influence of the first conductor and the second conductor, and
   wherein the first conductor and the second conductor are arranged in a first plane and the soft magnetic film is arranged in a second plane.

2. The sensor configuration according to claim 1, wherein the first conductor or second conductor has at least one pickup and by analysis of the electromagnetic coupling in a subsection defined by the pickup(s), the position and/or change in position of the measurement object can be determined.

3. The sensor configuration according to claim 2, wherein the pickups are arranged equidistantly, and in the case of a single pickup, it is arranged in the middle of the first conductor or second conductor.

4. The sensor configuration according to claim 2, wherein the pickups on the second conductor are each connected to a resistor whose other terminal is connected to a summation device.

5. The sensor configuration according to claim 2, wherein the pickups are wired to the second conductor in such a way that the voltages induced in the subsections are mutually canceled in a zero position of the measurement object.

6. The sensor configuration according to claim 1, wherein the first conductor and the second conductor are applied to a substrate.

7. The sensor configuration according to claim 1, wherein the first conductor and the second conductor are arranged at a distance d from one another.

8. The sensor configuration according to claim 7, wherein the distance d between the first conductor and the second conductor varies.

9. The sensor configuration according to claim 8, wherein a desired characteristic line of the sensor is established by varying the distance d.

10. The sensor configuration according to claim 1, wherein the conductors are trimmed by means of a laser for adjusting the sensor.

11. The sensor configuration according to claim 1, wherein the first conductor and the second conductor are designed to be straight.

12. The sensor configuration according to claim 1, wherein the first conductor and the second conductor are designed as a curve, in particular as an arc of a circle.

13. The sensor configuration according to claim 1, wherein a soft magnetic film is arranged on both sides of the two conductors.

14. The sensor configuration according to claim 1, wherein the first conductor (2) is connected to a current source for generating an alternating field.

15. The sensor configuration according to claim 1, wherein the magnet assigned to the measurement object is a permanent magnet or is formed by a coil through which a direct current flows.

16. The sensor configuration according to claim 1, wherein the first conductor and the second conductor are designed to be parallel to one another.

17. A method for determining the position or change in position of a measurement object relative to a sensor, said method comprising:

assigning a magnet to the measurement object, wherein an alternating field is generated by an alternating current flowing through a first conductor of the sensor and induces a voltage in a second conductor arranged longitudinally to the first conductor, such that the electromagnetic coupling between the first conductor and the second conductor is influenced by a soft magnetic film whose permeability changes under the influence of a magnetic field, and wherein the first conductor and the second conductor are arranged in a first plane and the soft magnetic film is arranged in a second plane.

18. The method according to claim 17, wherein at least two subsections of the conductor are defined by at least one pickup on the first conductor or second conductor and the position of the measurement object is determined from the electromagnetic coupling with one of these subsections.

19. The method according to claim 18, wherein the individual subsections have electricity flowing in them one after the other in the case of one or more pickups on the first conductor.

20. The method according to claim 18, wherein the individual subsections are analyzed one after the other or simultaneously in the case of one or more pickups on the second conductor.

* * * * *